United States Patent
Bauer

(12) 
(10) Patent No.: US 6,754,620 B1
(45) Date of Patent: Jun. 22, 2004

(54) SYSTEM AND METHOD FOR RENDERING DATA INDICATIVE OF THE PERFORMANCE OF A VOICE ACTIVITY DETECTOR

(75) Inventor: Samuel M Bauer, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/538,622

(22) Filed: Mar. 29, 2000

(51) Int. Cl.[7] .............................................. G06F 17/20
(52) U.S. Cl. .................... 704/214; 704/215; 704/208
(58) Field of Search ............................ 379/399.01, 351, 379/406.03, 350, 377; 704/223, 240, 248, 226, 228, 227, 208, 233, 211, 200, 205, 214, 215

(56) References Cited

U.S. PATENT DOCUMENTS

| | | | |
|---|---|---|---|
| 4,008,375 A | * | 2/1977 | Lanier |
| 5,353,233 A | * | 10/1994 | Olan et al. |
| 5,459,814 A | | 10/1995 | Gupta et al. ................ 395/2.42 |
| 5,737,331 A | | 4/1998 | Hoppal et al. ............... 370/349 |
| 5,739,807 A | | 4/1998 | Thong .......................... 345/134 |
| 6,078,882 A | * | 6/2000 | Sato et al. ................... 704/223 |

* cited by examiner

*Primary Examiner*—Rexford Barnie

(57) ABSTRACT

A system and method is provided for rendering data indicative of delays associated with enabling and/or disabling an analog-to-digital conversion system employed by a telephony communication network. The system of the present invention utilizes a display device and an interface manager. The interface manager receives data indicative of power levels at various frequencies and times of signals received by a transceiver that is communicating via the conventional telephony communication network. The interface manager then renders a graphical display via the display device based on the received data. The graphical display may include clusters, in which each of the clusters is associated with a particular range of power levels. By analyzing the clusters, a user can determine the delays associated with enabling and/or disabling the analog-to-digital conversion system. The graphical display may also include indicators that may be used to determine the foregoing delays.

18 Claims, 5 Drawing Sheets

SYSTEM AND METHOD FOR RENDERING DATA INDICATIVE OF THE PERFORMANCE OF A VOICE ACTIVITY DETECTOR

BACKGROUND OF THE INVENTION

1. Field of the Invention

The present invention generally relates to data processing techniques and, in particular, to a system and method for rendering data indicative of the performance of a voice activity detector that is utilized to control communication across a digital network.

2. Related Art

Many telephony networks are presently employing digital communication techniques to communicate voice signals. In this regard, a user telephone at a customer premises often transmits analog voice signals to a telephone network, which transmits the voice signals to a telephone at another customer premises. The analog voice signals are based on the speech of a user speaking into the transmitting telephone.

At some point in the network, the voice signals are converted into digital data, and the digital data is communicated over at least a portion of the network. Packet switching techniques, such as techniques in conformance with internet protocol (IP), may be used to communicate the digital data. Before a user of the receiving telephone hears the sounds defined by the digital data, the digital data is converted back into analog signals. This conversion back into analog signals may occur within the network or may occur at the premises of the receiving telephone.

The user speaking into the telephone transmitting the analog voice signals to the network often pauses and thereby causes periods of silence. The analog signals transmitted during these periods of silence usually include a small amount of noise but do not include any speech data.

To increase the performance of the telephone network, the network is often designed to refrain from transmitting the analog signals having no speech data through the digital portion of the network. In this regard, a voice activity detector (VAD) is employed by a conversion system that converts the analog signals into digital data for communication through the digital portion of the network. The VAD is configured to detect whether the analog signals received by the conversion system define voice or silence. In other words, the VAD is configured to detect whether the analog signals received by the conversion system include any speech data.

When the VAD detects silence or the absence of speech data, the VAD disables the conversion system, and when the VAD fails to detect silence, the VAD enables the conversion system. When disabled, the conversion system refrains from outputting digital data. Therefore, the analog signals transmitted by the transmitting telephone during silence periods should not be converted into digital data and transmitted through the digital portion of the network.

As a result, the total number of data packets transmitted by the digital portion of the network is reduced, thereby increasing the efficiency of the digital portion of the network. Since the user at the receiving telephone is typically interested in only hearing the speech of the user at the transmitting telephone, the increase in efficiency of the network by preventing the transmission of silence data can be achieved without a decrease in performance.

Unfortunately, there is usually a delay associated with enabling and/or disabling the conversion system when the signals received by the conversion system transition from silence to non-silence or vice versa. The delay in enabling the conversion system in response to the transition from silence signals to non-silence signals causes a portion of the speech data defined by the non-silence signals to be clipped. In this regard, the foregoing delay causes the conversion system to initiate the transmission of digital data packets a short time after the conversion system has begun receiving a set of analog signals defining a non-silent period. Therefore, the user at the receiving end may not hear the first portion (i.e., the clipped portion) of the speech defined by this set of signals. In cases of long delays in enabling the conversion system, a noticeable portion of the speech defined by the foregoing set of non-silence analog signals is clipped and is, therefore, not heard by the user at the receiving telephone. The phenomena of clipping the first portion of a set of analog signals defining a non-silent period due to the delay in enabling the conversion system is known as "front end clipping."

The delay in disabling the conversion system in response to the transition from non-silence signals to silence signals causes the conversion system to continue transmitting digital data packets a short time after the conversion system has received a set of analog signals defining a silent period. Therefore, a portion of these analog signals are converted into digital data and transmitted through the digital portion of the network by the conversion system. Since this results in the transmission of digital data defining silence, the efficiency of the network is reduced. As the delay in disabling the conversion system increases, more digital data packets defining silence are transmitted through the digital portion of the network, and the efficiency of the network, therefore, decreases.

To ensure adequate performance and efficiency of the telephony network, it is desirable to ensure that the VAD is working properly so that excessive delays in enabling and/or disabling the conversion system are prevented. Thus, a heretofore unaddressed need exists in the industry for a system and method capable of rendering data indicative of the performance of the VAD, such that a user can easily determine whether the delay in enabling and/or disabling the conversion system is excessive.

SUMMARY OF THE INVENTION

The present invention overcomes the inadequacies and deficiencies of the prior art as discussed hereinbefore. Generally, the present invention provides a system and method for rendering data indicative of the performance of the VAD.

In architecture, the system of the present invention utilizes a display device and an interface manager. The interface manager receives data indicative of power levels at various frequencies and times of signals received by a transceiver that is communicating via a conventional telephony communication network. The interface manager then renders a graphical display via the display device based on the received data. The graphical display includes clusters, and each of the clusters is associated with a particular range of power levels. Each pixel of each cluster is associated with a power level within the particular range.

In accordance with another feature of the present invention, the interface manager colors each cluster based on the particular power level range associated with the cluster. By analyzing the colors of the clusters, information pertaining to the amount of delay associated with enabling and disabling the conversion system can be determined.

In accordance with another feature of the present invention, indicators are used to identify when the conversion system is enabled and/or disabled and when the aforementioned transceiver receives a noise pulse. These indicators may be used to easily determine the amount of delay associated with enabling and/or disabling the conversion system.

The present invention can also be viewed as providing a method for use in a telephony communication system. The telephony communication system is configured to transmit signals from a transmitting device to a receiving device and includes a conversion system having a voice activity detector. The conversion system designed to convert analog signals received from the transmitting device into digital data for transmission over a portion of the telephony communication system. The voice activity detector is designed to detect silence periods defined by the signals transmitted from the transmitting device to the receiving device and to disable the conversion system during the silence periods. The method can be broadly conceptualized by the following steps: receiving data indicative of power levels at various frequencies and times of signals received by the receiving device; defining different ranges of the power levels; rendering a graphical display based on the data, the rendering step including the steps of: associating each pixel of the graphical display with a frequency value and a time value based on a location of the each pixel within the graphical display; associating each pixel of the graphical display with a power level value based on the data and based on the frequency value and the time value associated with the each pixel; and displaying a cluster for each group of adjacent pixels associated with power level values within a single one of the ranges.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
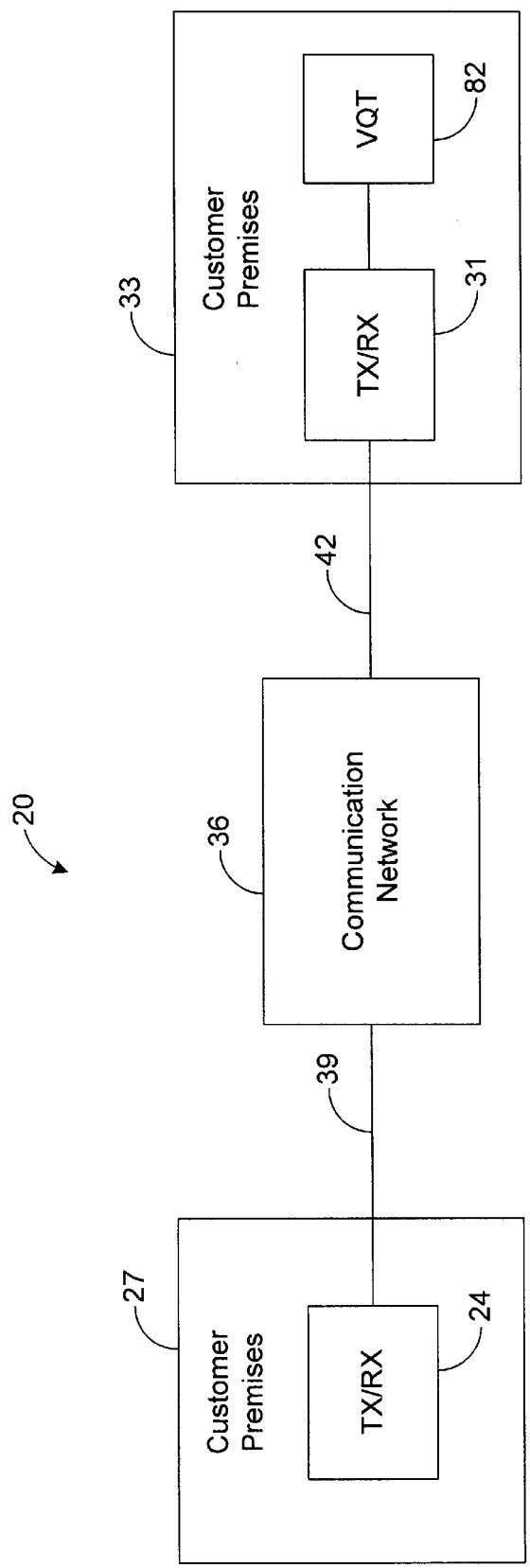
FIG. 1 is a block diagram illustrating a telephony communication system in accordance with the present invention.

FIG. 1 depicts a telephony communication system 20 in accordance with the present invention. In the embodiment shown by FIG. 1, the system 20 enables communication between a transceiver 24 at a first customer premises 27 and a transceiver 31 at another customer premises 33. The transceivers 24 and 31 may be telephones or other types of analog communication devices.

Transceiver 24 is coupled to a communication network 36 via a communication connection 39 extending from the network 36 to the customer premises 27. Furthermore, transceiver 31 is similarly coupled to the network 36 via a communication connection 42 extending from the network 36 to the customer premises 33. The communication connections 39 and 42 are sometimes referred to as "subscriber loops."

Signals transmitted across communication connection 39 by transceiver 24 are received by communication network 36, which routes the signals to communication connection 42. These signals are then received by transceiver 31. Similarly, signals transmitted across communication connection 42 by transceiver 31 are received by communication network 36, which routes the signals to communication connection 39. These signals are then received by transceiver 24. Therefore, except as otherwise described herein, any signals transmitted across communication connection 39 by transceiver 24 should be received by transceiver 31, and any signals transmitted across communication connection 42 by transceiver 31 should be received by transceiver 24.

The communication between transceivers 24 and 31 can be analog or digital. However, due primarily to the expense of extending digital communication connections 39 and 42 from the network 36, most communication connections 39 and 42 are employed as analog connections, yet in an effort to increase the efficiency of the system 20, at least a portion of the network 36 is digital. Therefore, in the preferred embodiment, the communication connections 39 and 42 are analog so that conventional subscriber loops employed by conventional communication systems may be employed to implement the present invention, although it is possible for the communication connections 39 and 42 to be digital in other embodiments. As such, the transceivers 24 and 31 are designed to communicate analog signals, which at some point in network 36 are converted into digital data. This digital data is then transmitted over a digital portion of the network 36 and is converted back into analog signals before being communicated across communication connections 39 or 42.

Figure 2:
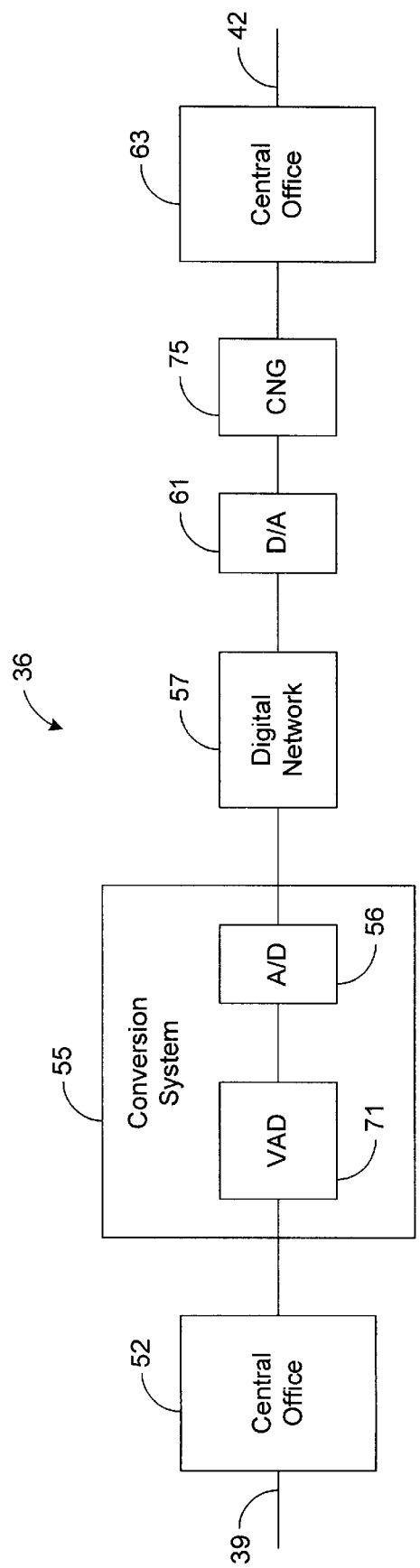
FIG. 2 is a block diagram illustrating a conventional telephony communication network that may be employed by the telephony communication system depicted in FIG. 1.

Various types of conventional networks may be employed to implement the communication network 36 shown by FIG. 1. In this regard, FIG. 2 depicts a more detailed view of a conventional network that may be used to implement communication network 36. As shown by FIG. 2, the communication connection 39 extending from customer premises 27 is usually coupled to a central office 52 that, as known in the art, performs various functionality such as switching, filtering, amplification, etc. The analog signals received by central office 52 from communication connection 39 are converted into digital data by a conversion system 55.

In this regard, the conversion system 55 is usually configured to sample the analog signals received from central office 52. The conversion system 55 includes an analog-to-digital (A/D) converter 56, and the value of each sampled signal is converted into digital data by the A/D converter 56. The digital data is then inserted into a data packet and transmitted over digital network 57. Therefore, each data packet corresponds to a sample of the signals from central office 52.

The digital network 57 employs conventional digital communication techniques, such as techniques in accordance with internet protocol (IP), to communicate the digital data packets from conversion system 55 to digital-to-analog (D/A) converter 61. The D/A converter 61 is designed to convert the digital data packets received from digital network 57 into analog signals via conventional techniques. A central office 63 receives these analog signals transmitted from D/A converter 61 and transmits these analog signals across communication connection 42. Similar to central office 52, the central office 63 may perform switching, filtering, amplification, and other processing techniques to appropriately interface the analog signals with communication connection 42.

Accordingly, referring again to FIG. 1, analog signals transmitted from transceiver 24 may be communicated to transceiver 31 via communication network 36. It should be noted that the communication between transceivers 24 and 31 may be bi-directional and that the communication network 36 may be similarly configured to transmit signals from transceiver 31 to transceiver 24. However, for the purposes of illustration, it will be assumed hereafter that signals are being communicated from transceiver 24 to transceiver 31. Therefore, transceiver 24 will be referred to hereafter as the "transmitting transceiver" and transceiver 31 will be referred to hereafter as the "receiving transmitter."

Sometimes, the analog signals received from transceiver 24 may define periods of silence, as previously mentioned in the Background section. It should be noted that a "silence period," as used herein, refers to a time period in which each amplitude peak during the time period is below a predefined threshold. The threshold should be selected such that low level noise commonly found in signals communicated via network 20 is typically below the threshold.

Furthermore, in the preferred embodiment, the transmitting transceiver 24 is configured to continuously transmit a low level tone (e.g., a low amplitude sine wave) or other type of continuous signal to enable the detection of when the conversion system 55 has been disabled, as will be described in more detail hereinafter. The aforementioned threshold is preferably selected such that the threshold is slightly above the peak amplitude value of this continuous low level signal. Accordingly, a period of silence refers to periods when the signals being communicated from the transmitting transceiver 24 have amplitude peaks lower than the threshold. Furthermore, a period of non-silence refers to periods when the signals being communicated from the transmitting transceiver 24 have amplitude peaks above the threshold and, therefore, above the amplitude peaks of the low level noise and of the continuous low level signal transmitted by the transmitting transceiver 24.

To improve the performance of the network 36, the conversion system 55 may include a voice activity detector (VAD) 71, as shown by FIG. 2. The VAD 71 is configured to disable the conversion system 55 during periods of silence to reduce the number of data packets transmitted by the conversion system 55. In this regard, the VAD 71, through conventional techniques, is configured to detect when the amplitude peaks of the analog signals received by the conversion system 55 are below the aforementioned threshold (i.e., to detect when a period of silence exists). If the VAD 71 detects a period of silence, the VAD 71 disables the conversion mechanism 55. The VAD 71 may disable the conversion system 55 by transmitting control signals to A/D converter 56 commanding the A/D converter 56 to discard or ignore the signals received by the A/D converter 56 during the period of silence, by discarding or ignoring the signals received by the VAD 71 during the period of silence, by commanding the conversion system 55 to refrain from sampling the received analog signals during the period of silence, or by some other suitable technique. As a result, the conversion mechanism 55 should transmit no data packets to digital network 57 during periods of silence.

If the VAD 71 detects that the amplitude peaks of the signals being received by the conversion system 55 are above the aforementioned threshold, then the VAD 71 enables the conversion system 55. When enabled, the conversion system 55 converts the signals presently received by the conversion system 55 into digital data and transmits this digital data to digital network 57. The VAD 71 may enable the conversion system 55 to perform the aforementioned functionality by refraining from disabling the conversion mechanism 55 or by some other suitable technique. In this regard, the conversion system 55 may be configured to continuously convert the received analog signals into digital data and to transmit this digital data to network 57, unless disabled by VAD 71.

Since the conversion system 55 is disabled during periods of silence, there are times when the D/A converter 61 is not receiving any data packets destined for the receiving transceiver 31. Therefore, the amplitude of the analog signals being produced by the D/A converter 61 should approach zero during these periods of silence. As a result, the low level noise commonly found in the signals transmitted by network 36 is effectively filtered out during periods of silence. The filtering out of the low level noise is typically undesirable because the presence of the low level noise during periods of silence indicates to a user of the receiving transceiver 31 that a connection between the transmitting transceiver 24 and the receiving transceiver 31 still exists, even though no speech data is presently being communicated between the two transceivers 24 and 31.

To correct for the problems associated with the filtering of the low level noise, many networks 36 include a comfort noise generator (CNG) 75. When the analog signals transmitted from D/A converter 61 approach zero (e.g., when the amplitude peaks of the analog signals are below a predefined threshold), the CNG 75 is configured to generate signals simulating the low level background sounds (e.g., the low level noise) detected in the non-silent signals received by the CNG 75 during the communication session. Since the analog signals transmitted from D/A converter 61 should approach zero during periods of silence, the CNG 75 is configured to generate signals during periods of silence so that the user at transceiver 31 is aware that communication with the other transceiver 24 has not been interrupted. The signals generated by the CNG 75 simulate the low level noise associated with the signals transmitted during the communication session.

Furthermore, since transceiver 24 continuously transmits a low level signal, such as a tone, the signals generated by the CNG 75 simulate this low level signal. The low level continuous signal generated by the CNG 75 is preferably similar to the low level continuous signal transmitted by the transceiver 24, except that the CNG 75 transmits over a different frequency range, as will be described in more detail hereinafter. Note that during periods of non-silence (i.e., when the CNG 75 receives analog signals from D/A converter 61 having amplitude peaks above the aforementioned threshold), the CNG 75 is configured to allow the analog signals received from D/A converter 61 to pass without modification and refrains from generating signals.

As mentioned in the Background section, there is usually a delay in disabling the conversion system 55 in response to a detection of a silent period by the VAD 71 and in enabling the conversion system 55 in response to a detection of a non-silent period by the VAD 71. These delays can significantly degrade the performance of the system 36, if the delays become too large. For example, a delay in disabling the conversion system 55 causes a larger number of data packets than necessary to be transmitted to the digital network 57, and a delay in enabling the conversion system 55 causes front end clipping. Consequently, it is desirable to measure the amount of delay associated with the VAD 71 in enabling and/or disabling the conversion system 55.

To measure the aforementioned delay in enabling and/or disabling the conversion system 55, the network 36 includes a voice quality tester (VQT) 82 coupled to the receiving transceiver 31, as shown by FIG. 1. The VQT 82 is configured to sample the analog signals received by transceiver 31 and to determine the amplitude of each sampled signal and the power of each sampled signal at various frequencies. The VQT 82 then renders the foregoing data such that a user can determine the performance of the VAD 71 within the network 36.

Figure 3:
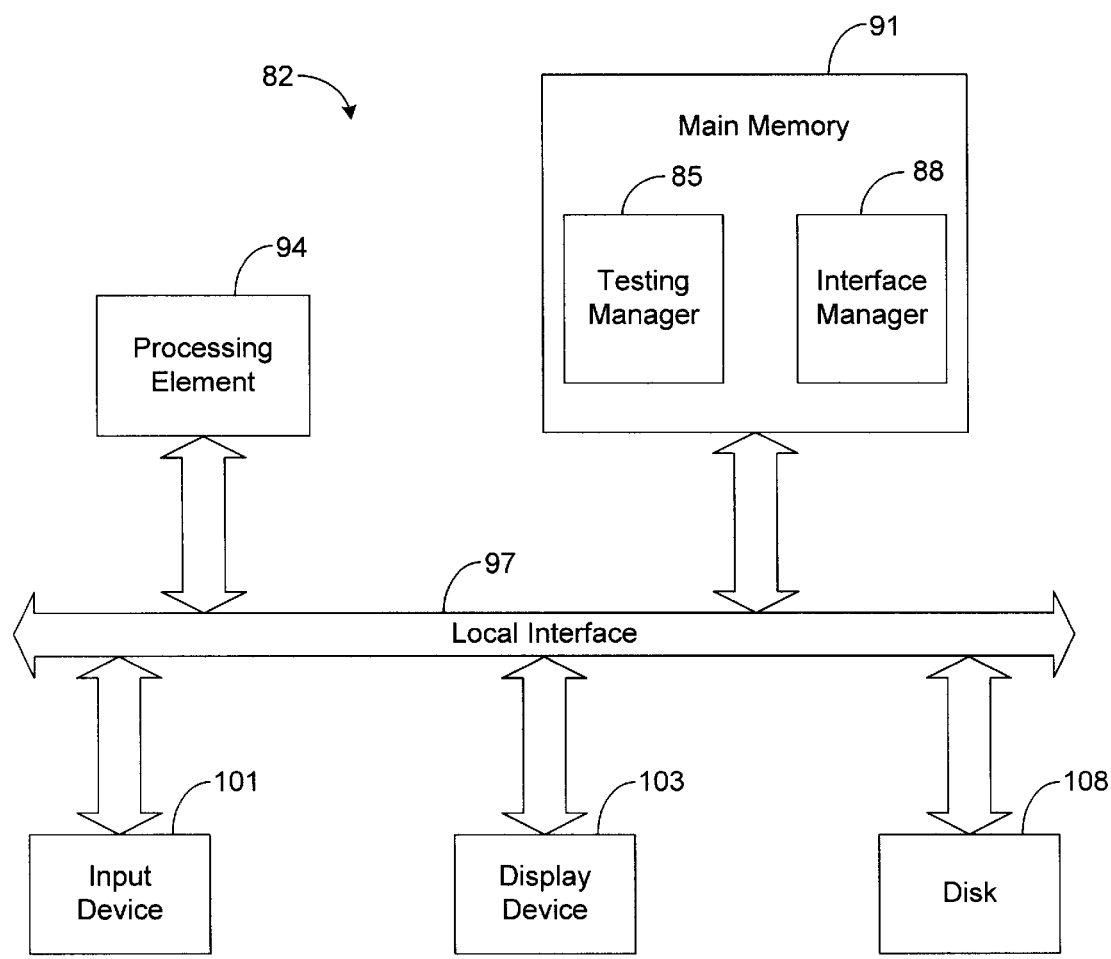
FIG. 3 is a block diagram illustrating a more detailed view of a voice quality tester depicted in FIG. 1.

FIG. 3 depicts a more detailed view of the VQT 82. As shown by the FIG. 3, the VQT 82 may be implemented as a computer system that includes a testing manager 85 and an interface manager 88. The testing manager 85 and interface manager 88 can be implemented in software, hardware, or a combination thereof. In the preferred embodiment, as illustrated by way of example in FIG. 3, the testing manager 85 and the interface manager 88 along with their associated methodology are implemented in software and stored in computer memory 91 of the VQT 82.

Note that the testing manager 85 and/or the interface manager 88, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the testing manager 85 and/or the interface manager 88 may be magnetically stored and transported on a conventional portable computer diskette.

The preferred embodiment of the VQT 82 of FIG. 3 comprises one or more conventional processing elements 94, such as a digital signal processor (DSP), that communicate to and drive the other elements within the VQT 82 via a local interface 97, which can include one or more buses. Furthermore, an input device 101, for example, a keyboard or a mouse, can be used to input data from a user of the VQT 82, and display device 103, such as a screen display or a printer, can be used to output data to the user. A disk storage mechanism 108 can be connected to the local interface 97 to transfer data to and from a nonvolatile disk (e.g., magnetic, optical, etc.).

To test the VAD 71, the transmitting transceiver 24 is designed to interrupt a silence period with a noise pulse. The noise pulse preferably has a duration that is specified prior to the test of the VAD 71, and the VQT 82 is preferably aware of the specified duration. For example, although other durations are possible, assume that the specified duration of the noise pulse is 300 milli-seconds (ms). The testing manager 85 of the VQT 82 preferably includes data indicating that the duration of the test pulse is 300 ms. Furthermore, in the foregoing example, the transceiver 24 transmits a noise pulse of 300 ms during a silence period such that silence exists immediately prior to the pulse and such that silence exist immediately following the pulse. The amplitude value of the noise pulse can vary during the 300 ms duration, but it is preferable for the amplitude peaks of the noise pulse to remain above the threshold used to identify silent periods.

In response to signals from the transceiver 24 associated with the silent period that exists immediately prior to the noise pulse, the VAD 71 of the conversion mechanism 55 disables the conversion mechanism 55. Therefore, these signals are not converted into digital data and transmitted to the digital network 57. Once the VAD 71 begins to receive signals associated with the 300 ms pulse, the VAD 71 enables the conversion mechanism 55, and in response, the conversion mechanism 55 begins to convert these signals into digital data and to transmit the digital data across digital network 57. However, due to the delay in enabling the conversion mechanism 55 in response to the noise pulse, the first portion (i.e., the front end portion) of the noise pulse is clipped by the conversion mechanism 55. In other words, the analog signals defining the front end of the noise pulse are not converted into digital data and transmitted to digital network 57 by conversion mechanism 55. As a result, the duration of the pulse defined by the digital data transmitted from the conversion mechanism 55 is reduced by an amount equal to the delay in enabling the VAD 71.

In response to signals from the transceiver 24 associated with the silent period that exists immediately after the noise pulse, the VAD 71 of the conversion mechanism 55 disables the conversion mechanism 55. However, due to the delay in disabling the conversion mechanism 55, the conversion mechanism 55 continues to convert the signals defining this silence period into digital data and to transmit this digital data to network 57 for an amount of time after the pulse. This amount of time after the pulse should equal the amount of delay associated with disabling the conversion mechanism 55. As a result, the foregoing digital data transmitted after the noise pulse and before the conversion system 55 is actually disabled should define only low level noise and the continuous low level signal transmitted by the transceiver 24.

Once the conversion system 55 is disabled after the noise pulse and the CNG 75 is no longer receiving digital data transmitted by the conversion system 55, the CNG 75 is activated. Therefore, the CNG 75 generates signals simulating low level noise and the low level continuous signal transmitted by transceiver 24. However, the frequency range of the low level continuous signal generated by the CNG 75 is different than the frequency range of the low level continuous signal generated by the transceiver 24.

Although the frequency range of the low level continuous signal generated by the CNG 75 is different than the frequency range of the low level continuous signal generated by the transceiver 24, it is possible for the frequency ranges to overlap. For example, in the preferred embodiment, the transceiver 24 preferably generates a low level continuous signal within a narrow frequency range while the CNG 75 generates a similar low level continuous signal within a broader frequency range. The broader frequency range may include the narrow frequency range. For example, the narrow frequency range may include frequency values between approximately 2475 Hertz (Hz) and 2525 Hz, while the broader frequency range may include frequency values between approximately 1000 Hz and 4000 Hz. It should be apparent to one skilled in the art that other frequency ranges are possible without departing from the principles of the present invention.

Based on the signals received by the transceiver 31, the testing manager 85 of the VQT 82 is configured to determine the delay times associated with enabling and disabling the conversion system 55. In this regard, the testing manager 85 is designed to determine the duration of the aforementioned noise pulse received by transceiver 31 and to retrieve the value indicating the duration of the aforementioned noise pulse as originally transmitted from transceiver 24. Then, the testing manager 85 is designed to determine the delay time associated with enabling the conversion system 55 by subtracting the duration of the impulse received by transceiver 31 from the foregoing retrieved value.

Furthermore, the testing manager 85 is also configured to determine the time between the end of the aforementioned noise pulse received by transceiver 31 and the start of signal generation by the CNG 75. As previously described, the time between the start of the signal generation from the CNG 75 and the end of the noise pulse should correspond to the delay associated with disabling the conversion system 55. As a result, the testing manager 85 is configured to determine the delay associated with disabling the conversion system 55 by subtracting a time value indicating when the end of the noise pulse was received by the transceiver 31 from a time value indicating when the transceiver 31 began to receive signals generated by the CNG 75 subsequent to the foregoing noise pulse. The testing manager 85 may determine when the end of the noise pulse occurred by determining when the amplitude peaks of the signals received by transceiver 31 transitioned from values higher than the aforementioned threshold to values lower than the aforementioned threshold. Furthermore, the testing manager 85 may determine when the CNG 75 began transmitting signals by determining when the frequency range of the signals received by the transceiver increased outside of the narrow range subsequent to the noise pulse.

The interface manager 88 is designed to render via display device 103 the data obtained by the testing manager 85, such that a user can determine whether or not the delay associated with enabling and/or disabling the conversion system 55 is acceptable. In this regard, the interface manager 88 may display numerical values indicating the amount of delay associated with enabling and/or disabling the conversion system 55.

Figure 4:
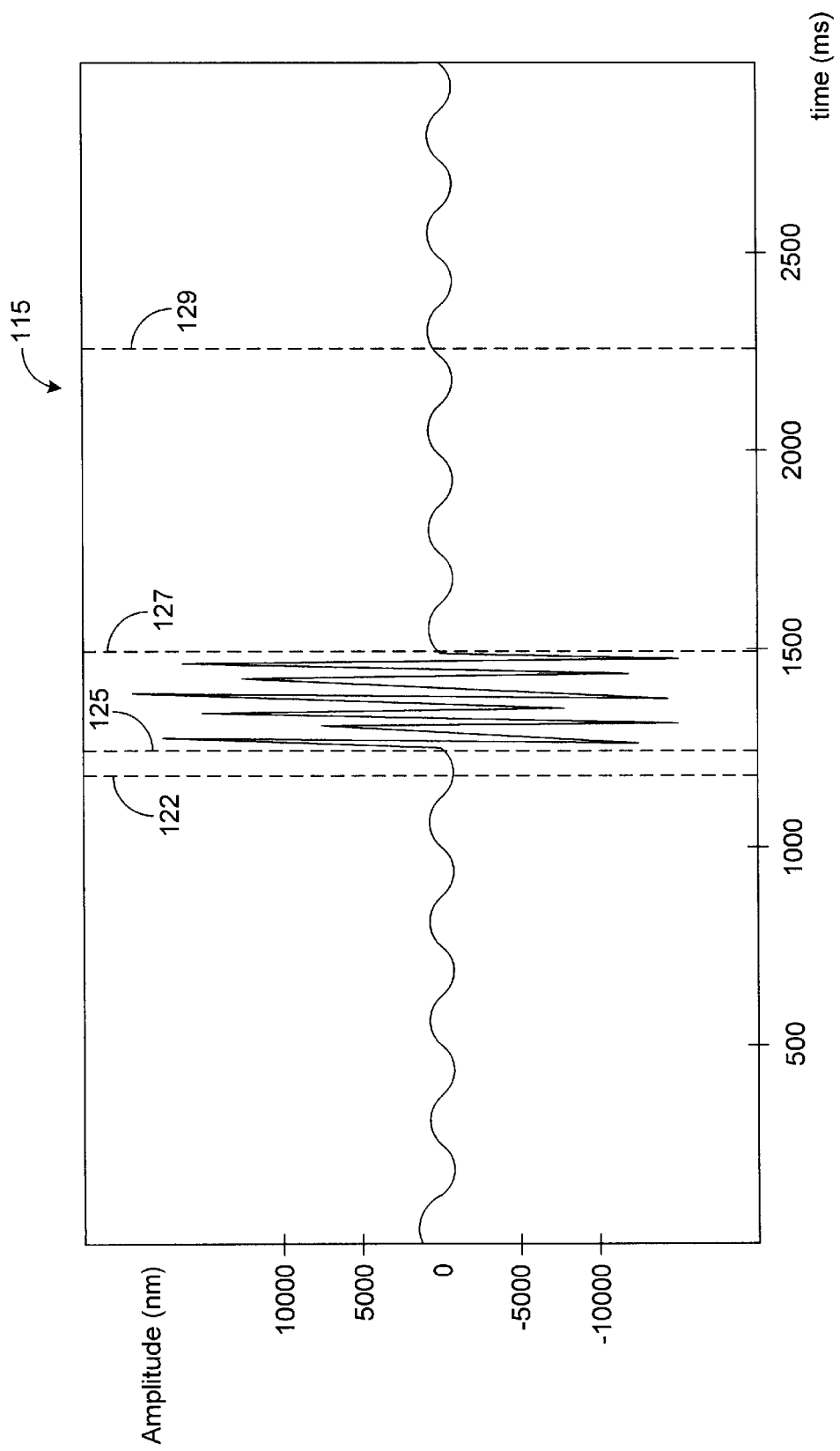
FIG. 4 is a diagram illustrating a graph that may be rendered by the voice quality tester of FIG. 3 to show characteristics of delays associated with enabling and disabling the conversion system of FIG. 2.

In addition to or in lieu of displaying numerical values indicative of the delays associated with enabling and/or disabling the conversion mechanism 55, the interface manager 88 may be configured to display a graph indicative of when the conversion system 55 is enabled and/or disabled relative to the aforementioned noise pulse. For example, FIG. 4 depicts a graph 115 of amplitude versus time for the noise pulse received by the transceiver 31. Based on the graph 115, a user should be able to determine the duration of the noise pulse, and by subtracting this duration from the duration of the pulse as originally transmitted by transceiver 24, the user can determine the delay associated with enabling the conversion mechanism 55.

To facilitate this determination, the interface manager 88 may display an indicator 122 or other type of marker indicating the time that the transceiver 31 would have begun receiving the pulse, if the front end of the pulse had not been clipped by the conversion mechanism 55. The interface manager 88 may achieve this functionality by positioning indicator 122 on the graph 15 such that the distance between the indicator 122 and the end of the pulse corresponds to the original duration of the pulse as transmitted from transceiver 24. To further aide in determining the foregoing delay time, the interface manager 88 may position indicators 125 and/or 127 at the times when the transceiver 31 actually received the beginning and the end of the noise pulse, respectively, as shown by FIG. 4.

As previously set forth, the testing manager 85 may determine when the transceiver 31 began to receive signals generated by the CNG 75 instead of the transceiver 24 subsequent to the pulse. The interface manager 88 may position an indicator 129 at the time when the transceiver 31 began to receive signals generated by the CNG 75 so that a user, by viewing the graph 115, can determine the amount of delay in disabling the conversion system 55.

Figure 5:
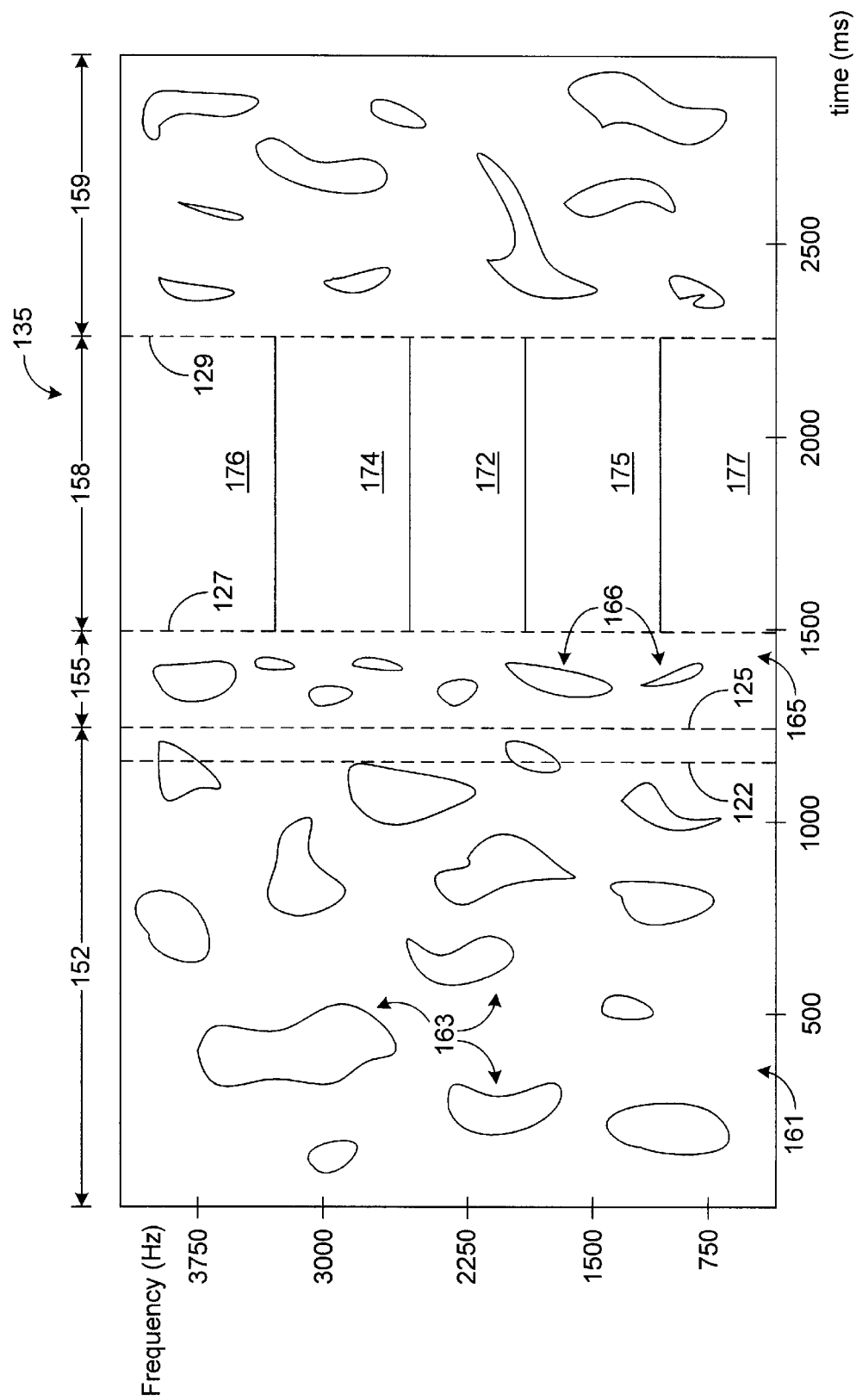
FIG. 5 is a diagram illustrating another embodiment of a graph that may be rendered by the voice quality tester of FIG. 3 to show characteristics of delays associated with enabling and disabling the conversion system of FIG. 2.

FIG. 5 depicts another graph 135 that may be displayed by the interface manager 88. Corresponding colors on the graph 135 may represent corresponding power ranges. In this regard, the power range of the signals received by transceiver 31 is divided into different sub-ranges, and a particular color is assigned to each of the sub-ranges. For example, one of the sub-ranges could be defined as between 30 milli-watts (mW) and 45 mW, and another of the sub-ranges could be defined as between 45 mW and 60 mW. Furthermore, the color red could be assigned to the first sub-range, and the color yellow could be assigned to the second sub-range. Therefore, each power value represented on the graph 135 having a value between 30 mW and 45 mW is represented by the color red, and each power value represented on the graph 135 having a value between 45 mW and 60 mW is represented by the color yellow.

Each point or pixel on the graph 135 is associated with a time value and a frequency value. The color of the point indicates the power of the signal received by the transceiver 31 at the time corresponding to the foregoing time value and at the frequency corresponding to the foregoing frequency value. In other words, the graph 135 represents the power spectrum for the signals received by the transceiver 31 during a particular time period (preferably the time period in which the noise pulse is received by the transceiver 31) and for a particular frequency range. For example, assume that the power of the signal received by the transceiver 31 at the time represented by the value 1000 ms is 35 mW at a frequency of 2400 Hz. According to the foregoing exemplary ranges described above, the point or pixel associated with the time value of 1000 ms and the frequency value of 2400 Hz should be colored red.

Since the graph 135 represents the power spectrum for the signals received by the transceiver 31, as described above, a user should be able to quickly view the graph 135 and determine delay characteristics associated with the enabling and disabling of the conversion system 55. In this regard, conversion mechanism 55 should be disabled during the silence period that occurs immediately prior to the noise pulse. Therefore, CNG 75 instead of the transceiver 24 should be generating the continuous low level signal received by the transceiver 31 during this silence period. As a result, the power of this signal should be distributed across a wide range of frequencies, causing the power level of most of the points or pixels in the graph 135 representing this silence period to be relatively low. In FIG. 5, this time period is represented by portion 152, which corresponds to the points that are associated with time values less than the time value marked by indicator 125.

Since most of the points in portion 152 should be at a relatively low power level, the background cluster 161 of the portion 152 is likely to have a color associated with low power. Clusters of adjacent points or pixels in portion 152 represented by clusters 163 may have higher power levels and, therefore, have a color associated with a higher power.

During the noise pulse, the power of the signals is again distributed across a wide range of frequencies. However, the power levels of most of the points in the graph 135 representing the period when the transceiver 31 is receiving the noise pulse should be significantly higher than the power levels of the points representing the silence period before the pulse. The period when the transceiver 31 is receiving the noise pulse is represented by portion 155 of the graph 135, which corresponds to the points or pixels in the graph 135 between indicator 125 and indicator 127. Therefore, although the portion 152 and portion 155 may have similar patterns, the colors used to represent most of the points or pixels in portion 152 should be different than the colors used to represent most of the points or pixels in portion 155. In particular, the colors of the background cluster 165 of the portion 155 and the clusters 166 of the portion 155 should be different than the colors of the background cluster 161 of portion 152 and the clusters 163 of portion 152.

During the delay in disabling the conversion mechanism 55, the conversion mechanism 55 is transmitting digital data defining the low level continuous signal transmitted from transceiver 24. Therefore, portion 158 of the graph 135 representing the time period when the transceiver 31 is receiving this low level continuous signal from transceiver 24 should have a pattern different than the other portions 152, 155, and 159. In this regard, the power of the noise should be concentrated within the narrow frequency range used by the transceiver 24 in generating the noise. Therefore, the points pixels in the portion 158 representing this narrow range should be associated with a high power level while the remainder of the portion 158 should be at lower power levels. As a result, the points in the portion 158 representing the narrow frequency range should be colored one color, while the remainder of the portion 158 should be colored different colors, as shown by FIG. 5. In FIG. 5, cluster 172 of portion 158 represents the narrow frequency range and, therefore, should be colored differently than clusters 174, 175, 176, and 177.

Once the conversion system 55 is disabled, the conversion system 55 no longer transmits, and the CNG 75 begins generating signals, including a low level continuous signal similar to the low level continuous signal transmitted by the transmitting transceiver 24. Therefore, the pattern of portion 159 of the graph 135 representing the time period after the conversion system 55 is disabled subsequent to the noise pulse should correspond to the pattern of portion 152, since both portions 152 and 159 represent time periods when the transceiver 31 is receiving signals generated by the CNG 75.

As a result, a user can view the graph 135 to determine the duration of the pulse received by transceiver 31 and to determine how long the transceiver 31 received low level noise generated by transceiver 24 once the noise pulse ended. Therefore, the user can determine the delay associated with enabling and disabling the conversion system 55.

As shown by FIG. 5, the indicators 122, 125, 127, and/or 129 may be included to aide the user's analysis of the graph 135. However, it is not necessary for the interface manager 88 to display any of the indicators 122, 125, 127, and 129. Furthermore, if desired, the interface manager 88 may superimpose the graph 115 shown by FIG. 4 with the graph 135 shown by FIG. 5 to increase the amount of information rendered by the interface manager 88. In addition, changing the power ranges associated different colors affects the pattern of the graph 135. For example, the range of power levels associated with the background color of portion 152 may be broadened such that clusters 163 are eliminated. Accordingly, patterns other than the ones shown by FIG. 5 are possible, and different ranges may be employed to implement the present invention provided that the pattern and/or color of portion 158 is different than the other portions 152, 155, and 159. Furthermore, it is preferable to select the power ranges associated with portions 152 and 155 such that the color of portion 155 is different than the color of portion 152.

In addition, it is not necessary to utilize different color ranges in FIG. 5. In this regard, the graph 135 can be can be plotted via the same pattern without color. Therefore, instead of coloring each cluster of points within the same power range with the same color, each cluster of points or pixels within the same power range can be outlined. Therefore, a graph 135 without color and identical to FIG. 5 may be produced. Based on the pattern, the portion 158 should be distinguishable from the other portions 152, 155, and 159, as shown by FIG. 5. However, without the use of indicator 125, it may be difficult to distinguish between portions 152 and 155 without color coding the power spectrum.

Furthermore, it should be noted that the communication connections 39 and 42 have been described herein as being analog. Therefore, the conversions of analog signals into digital data and of digital data into analog signals occur in the network 36. However, in embodiments where connections 39 and 42 are digital, these conversions should occur at customer premises 27 and 33 instead. Therefore, in these embodiments, the conversion system 55 may be located at customer premises 27 instead of network 36. However, other than changing the location where signals are converted from analog to digital and from digital to analog, the operation of the present invention should remain essentially the same.

It should be noted that the CNG 75 has been described herein as activating and deactivating based on the amplitude of the signals transmitted from D/A converter 61. However, there may be other methodologies for controlling the activation and deactivation of the CNG 75 without departing from the principles of the present invention. Furthermore, although utilization of the CNG 75 is preferable, it is not necessary. In this regard, the operation of the present invention is essentially the same, if the system 20 is implemented without a CNG 75. In particular, the pattern of the graph 135 should remain the same as that depicted by FIG. 5 in embodiments where the CNG 75 is not utilized. However, the power levels of portions 152 and 159 are likely to be lower. Furthermore, the portions of the graph 115 corresponding to times when the transceiver 31 is not receiving a noise pulse or a continuous low level signal from transceiver 24 are likely to be associated with an amplitude value close to zero.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

Now, therefore, the following is claimed:

1. An interface system for use in a telephony communication system, said telephony communication system configured to transmit signals from a transmitting device to a receiving device and including a conversion system having a voice activity detector, said conversion system configured to convert analog signals received from said transmitting device into digital data for transmission over a portion of said telephony communication system, said voice activity detector configured to detect silence periods defined by said signals transmitted from said transmitting device to said receiving device and to disable said conversion system during said silence periods, said interface system comprising:

a display device;

said transmitting device transmitting a low level continuous signal, and an interface manager configured to receive data indicative of power level, and time of signals received by said receiving device, said interface manager configured to render a graphical display via said display device based on said data, said graphical display visually differentiating said data according to predefined ranges of power levels, and positioning said data on said graphical display according to said frequency and time of said data wherein a length of said graphical display in a first direction is indicative of time and a length of said graphical display in a second direction is indicative of frequency.

2. The interface system of claim 1, wherein said interface manager is configured to color code a representation of said data based on said predefined power level ranges.

3. The interface system of claim 1, wherein said interface manager is configured to position a first indicator within said graphical display at a location corresponding to a time when said receiving device began to receive a noise pulse and to position a second indicator within said graphical display at a location such that a distance between said first and second indicators is indicative of a delay associated with enabling said conversion system.

4. The interface system of claim 1, wherein said interface manager is configured to position a first indicator within said graphical display at a location corresponding to a time when said receiving device stopped receiving a noise pulse and to position a second indicator within said graphical display at a location corresponding to a time when said receiving device stopped receiving signals transmitted from said conversion system.

5. The interface system of claim 4, wherein a distance between said first and second indicators is indicative of a delay associated with disabling said conversion system.

6. An interface method for use in a telephony communication system, said telephony communication system configured to transmit signals from a transmitting device to a receiving device and including a conversion system having a voice activity detector, said conversion system configured to convert analog signals received from said transmitting device into digital data for transmission over a portion of said telephony communication system, said voice activity detector configured to detect silence periods defined by said signals transmitted from said transmitting device to said receiving device and to disable said conversion system during said silence periods, said interface method comprising the steps of:

transmitting a low level continuous signal from said transmitting device;

receiving data indicative of signal power levels, frequency and time of signals received by said receiving device;

defining different ranges of power levels;

rendering a graphical display based on said data, said rendering step including the steps of:

representing said data on said graphical display according to said frequency and said time of said data; and visually differentiating said data on said graphical display by associating data signal power level with one of said defined ranges of power levels.

7. The method of claim 6, wherein said step of visually differentiating further comprises the step of representing said predefined power level range according to color.

8. The method of claim 6, wherein said rendering step further comprises the steps of:

positioning a first indicator within said graphical display at a location corresponding to a time when said receiving device began to receive a noise pulse; and positioning a second indicator within said graphical display at a location such that a distance between said first and second indicators indicates an amount of delay associated with enabling said conversion system.

9. The method of claim 6, wherein said rendering step further comprises the steps of:

positioning a first indicator within said graphical display at a location corresponding to a time when said receiving device stopped receiving a noise pulse; and positioning a second indicator within said graphical display at a location corresponding to a time when said receiving device stopped receiving signals transmitted from said conversion system.

10. The method of claim 9, wherein said rendering step further comprises the step of indicating, via a distance between said first and second indicators, an amount of delay associated with disabling said conversion system.

11. An interface method for use in a telephony communication system, said telephony communication system configured to transmit signals from a transmitting device to a receiving device and including a conversion system having a voice activity detector, said conversion system configured to convert analog signals received from said transmitting device into digital data for transmission over a portion of said telephony communication system, said voice activity detector configured to detect silence periods defined by said signals transmitted from said transmitting device to said receiving device and to disable said conversion system during said silence periods, said interface method comprising the steps of:

transmitting a low level continuous signal from said transmitting device;

receiving data indicative of signal power level, frequency and time of signals received by said receiving device; and rendering a graphical display based on said data, said rendering step including the steps of:

positioning said data on said graphical display according to said frequency and said time of said data;

visually differentiating said data on said graphical display by defining a different color for each said defined range of power level and associating said signal power level with one of said defined ranges of power level.

12. The method of claim 11, wherein said rendering step further comprises the steps of:

positioning a first indicator within said graphical display at a location corresponding to a time when said receiving device began to receive a noise pulse; and positioning a second indicator within said graphical display at a location such that a distance between said first and second indicators indicates an amount of delay associated with enabling said conversion system.

13. The method of claim 11, wherein said rendering step further comprises the steps of:

positioning a first indicator within said graphical display at a location corresponding to a time when said receiving device stopped receiving a noise pulse; and positioning a second indicator within said graphical display at a location corresponding to a time when said receiving device stopped receiving signals transmitted from said conversion system.

14. The method of claim 13, wherein said rendering step further comprises the step of indicating, via a distance between said first and second indicators, an amount of delay associated with disabling said conversion system.

15. An interface method for use in a telephony communication system, said telephony communication system configured to transmit signals from a transmitting device to a receiving device and including a conversion system having a voice activity detector, said conversion system configured to convert analog signals received from said transmitting device into digital data for transmission over a portion of said telephony communication system, said voice activity detector configured to detect silence periods defined by said signals transmitted from said transmitting device to said receiving device and to disable said conversion system during said silence periods, said interface method comprising the steps of:

transmitting a noise pulse of known duration from said transmitting device;

receiving data indicative of when said noise pulse is transmitted;

producing, based on said data, a graph of a parameter of signals received by said receiving device versus time;

positioning a first indicator within said graph at a location corresponding to a time when said receiving device began receiving a noise pulse; and positioning a second indicator within said graph at a location such that a distance between said first and second indicators indicates an amount of delay associated with enabling said conversion system.

16. The method of claim 14, further comprising the step of visually differentiating data based upon a signal power of said signals received by said receiving device.

17. The method of claim 14, further comprising the steps of:

transmitting a low level continuous signal from said transmitting device, said noise pulse having a shorter duration than said low level continuous signal;

positioning a third indicator within said graph at a location corresponding to a time when said receiving device stopped receiving said noise pulse; and positioning a fourth indicator within said graph at location corresponding to a time when said receiving device stopped receiving said low level continuous signal.

18. The method of claim 17, further comprising the step of indicating, via a distance between said third and fourth indicators, an amount of delay associated with disabling said conversion system.

* * * * *